United States Patent

[11] 3,571,951

| [72] | Inventors | Herbert A. Siegel;<br>Dorothy G. Siegel, 901 Barebranch Court,<br>Baltimore, Md. 21208 |
|---|---|---|
| [21] | Appl. No. | 770,322 |
| [22] | Filed | Oct. 24, 1968 |
| [45] | Patented | Mar. 23, 1971 |

[54] MULTISENSORY APPROACH TO READING AND READING READINESS
14 Claims, 9 Drawing Figs.

[52] U.S. Cl. ............................................. 35/35
[51] Int. Cl. ........................................... G09b 17/00
[50] Field of Search........................................ 35/8, 9, 22, 22.5, 35, 35.4, 35.8, .9, 48.1, 69, 71; 283/44, 45, 46

[56] References Cited
UNITED STATES PATENTS

| 1,103,369 | 7/1914 | Montessori.................. | 35/71 |
| 1,732,980 | 10/1929 | Mooney...................... | 35/71 |
| 2,723,465 | 11/1955 | Silverstein................... | 35/22(5)X |
| 3,195,242 | 7/1965 | Ward et al. .................. | 35/9 |
| 3,314,168 | 4/1967 | Heckman..................... | 35/31(.8) |
| 3,363,336 | 1/1968 | Skinner....................... | 35/9X |

FOREIGN PATENTS

| 193,470 | 2/1923 | Great Britain................ | 35/69 |

OTHER REFERENCES
Dr. Montessori' s own handbook, 1914, Frederick Stokes Publishers Lb 1169 M763 pages 36— 39

*Primary Examiner*—Wm. H. Grieb
*Attorney*—Sabol and O'Brien Christen

ABSTRACT: Methods of multisensory association for reading and reading readiness comprising providing material having multicharacteristic indicia associated therewith, such as color, size and texture, scanning the material by sight, and simultaneously scanning the material by feel whereby a plurality of senses are utilized.

INVENTORS,
HERBERT A. SIEGEL
DOROTHY G. SIEGEL

INVENTORS,
HERBERT A. SIEGEL
DOROTHY G. SIEGEL

BY Christen, Sabol & O'Brien
ATTORNEYS

Fig.5

Steve eats
Kathy is a baby
Kathy has a bed
Lisa eats cheese

MULTISENSORY APPROACH TO READING AND READING READINESS

BACKGROUND OF THE INVENTION

The present invention pertains to methods of multisensory reading of textual material and multisensory association for reading readiness and more particularly to such methods wherein material with multicharacteristic indicia is utilized to facilitate association of syntactic elements and basic forms.

Development of reading skills does not begin with the commencement of formal education, as is commonly thought but rather begins the day a child perceives the world around him. This is because one of the basic reading skills is the ability to discriminate the forms and shapes of one's perceptual world, and since all children are not exposed to the same perceptual world and all children are not endowed with the same learning ability, upon commencement of formal education various children have varying levels of reading readiness.

In order to compensate for varying levels of reading readiness it is common to divide classes of students by their ability; that is, to divide the classes into a group with above average abilities, a group with average abilities, and a group with below average abilities. The reasons for such divisions are to permit each group of students to proceed with their reading education at their own pace rather than slowing down the above average group and/or speeding up the below average group.

This group division approach to dealing with the problem of varying levels of reading readiness suffers from the disadvantages that all children in the same class cannot discuss the same reading material, and since reading is basic to many other educational fields, the gap between the groups widens rapidly. Also, there are undesirable psychological effects produced by the separation of individuals with respect to their abilities, and furthermore the organization and planning required is extensive and the time spent therewith is wasteful.

The most desirable manner in which to educate children is to maintain an entire class reading subject matter of the same level and complexity; however, until now no method had been devised that was effective in maintaining a standard level without depriving the above average students of the advanced education to which they are entitled and deserve.

SUMMARY OF THE INVENTION

Accordingly, it is an object of the present invention to permit all students of a class to read material of a level commensurate with the abilities of the above average students by providing textual material having various levels of multicharacteristic indicia associated therewith to aid students of lesser abilities by permitting them to utilize a plurality of senses in reading.

The present invention has another object in that a method of multisensory reading is provided whereby textual material may be scanned by sight and feel.

Another object of the present invention is to use multisensory association to promote reading readiness by permitting a student to utilize a plurality of senses to recognize, compare and distinguish forms and shapes.

The present invention is advantageous over prior methods of reading in that individuals in a class may read the same subject matter regardless of their levels of reading ability, the basic skills necessary in reading may be taught to young children to prepare them for reading, and a plurality of senses may be utilized to aid in discriminating objects, letters, sounds and words.

The present invention is generally characterized in a method of multisensory reading comprising the steps of providing material having multicharacteristic indicia associated therewith, scanning the material by sight, and simultaneously scanning the material by feel whereby a plurality of senses may be utilized.

Other objects and advantages of the present invention will become apparent from the following description of the preferred embodiments and the accompanying drawings.

BRIEF DESCRIPTION OF THE DRAWINGS

FIG. 5 is a plan view of a plurality of sentences for use with reading according to the present invention.

DESCRIPTION OF THE PREFERRED EMBODIMENTS

Figure 1:
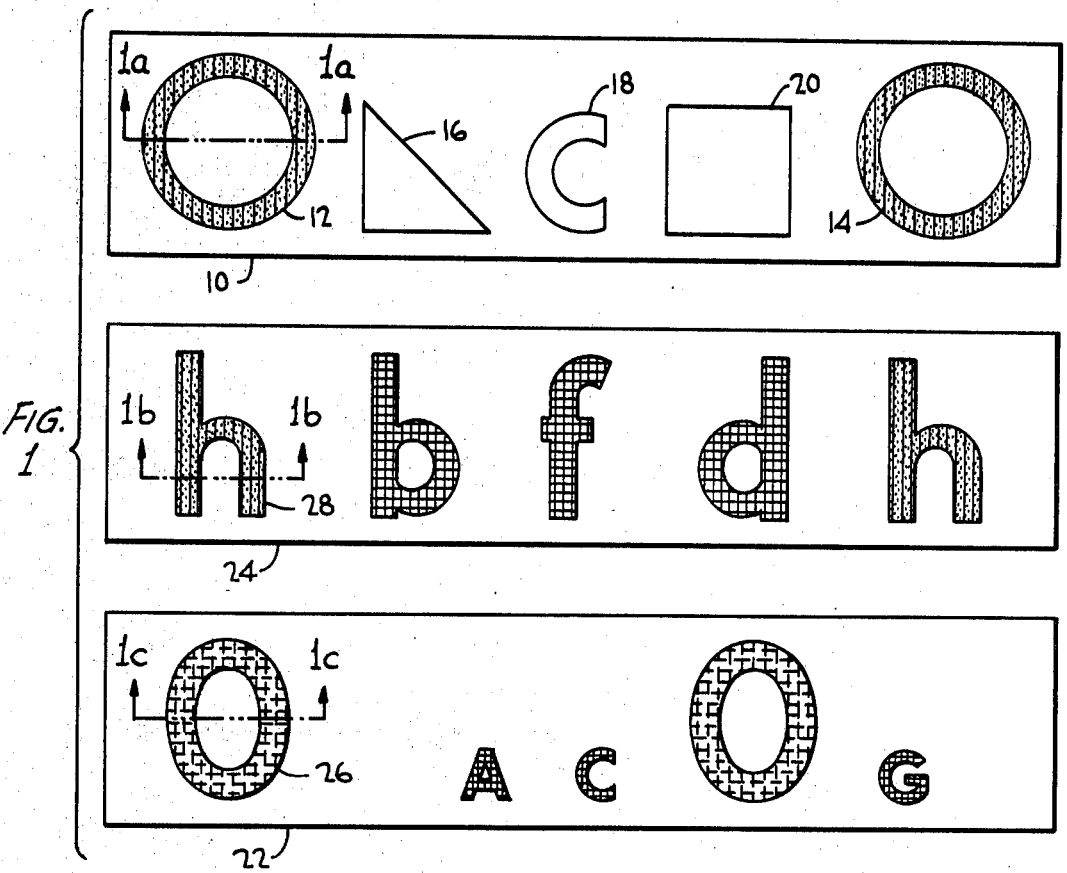
FIG. 1 is a plan view of material for use with reading readiness according to the present invention.
Figure 1A:
FIG. 1a is a sectional view taken along lines 1a–1a of FIG. 1.

One manner in which the multisensory approach to reading readiness according to the present invention may be implemented is illustrated in FIG. 1. The first line 10 in FIG. 1 contains an original 12 comprising a circle colored bright red and having a prickled texture as shown in FIG. 1a which is a sectional view of original 10 taken along lines 1a–1a. A child is instructed to find that one of the objects in the same line which is a duplicate of the original. By scanning the line 10 of objects by sight and feel simultaneously, the child will determine that object 14 is the duplicate of original 10 and to arrive at this determination the child will have had to avail himself of form discrimination in that he must distinguish the circle of the original from a triangle 16, a semicircle 18 and a square 20. Furthermore, color discrimination may be utilized to distinguish the objects, and the objects may also be distinguished by feel. That is, only the original 10 and duplicate 14 have the same prickled texture and thus a plurality of senses are utilized in distinguishing the duplicate object.

Figure 1B:
FIG. 1b is a sectional view taken along lines 1b–1b of FIG. 1.
Figure 1C:
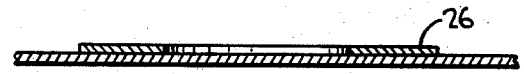
FIG. 1c is a sectional view taken along lines 1c–1c of FIG. 1.

As can be seen from lines 22 and 24 of FIG. 1, the child may progress in his basic reading skills by gradually removing some of the distinguishing features of the objects to be matched with the original and by exposing the child to letters. For instance, in line 22 the original 26 is a large, gold "O" with a raised shiny surface as shown in FIG. 1c which is a sectional view of original 26 taken along lines 1c–1c, and the objects from which the duplicate must be selected are all letters. Thus, when working with line 22, the child is aided in selecting the duplicate by form, size, color and texture, thereby permitting simple detection of the duplicate while exposing the child to forms of letters. This exposure may be enhanced by stating the name of each letter as it is considered by the child.

In line 24 size discrimination has been taken away as an aid to the child and thus in order to select the correct duplicate of an original 28, the child may only rely on form, color and texture discrimination. An original 28 is a small "h" having a red color and a feltlike texture as shown in FIG. 1b which is a sectional view of original 28 taken along lines 1b–1b, and thus the child must differentiate the forms of the objects from which the duplicate is to be selected, in this case the letters "b," "f," and "d." However, the child is still aide by color and texture in determining the duplicate of original 28.

The next discrimination aid to be removed may be either texture or color; however, it is preferred to remove texture first in order to provide all students with more similar textbooks. Once texture is removed it is realized that the child has only to rely on form and color to select the duplicate of an original The final step is, of course, to remove color and allow the child only the aid of form discrimination to select the correct duplicate of the original, since form discrimination is the skill necessary for proper reading.

Thus it is seen that a method of multisensory association for reading readiness is provided whereby material having multicharacteristic indicia associated therewith, such as color, form, size and texture, may be scanned simultaneously by sight and feel. Not only are the senses of sight and feel utilized by the child but sight discrimination is enhanced by the use of bright colors and different size objects which stimulate the child to facilitate learning.

Figure 2:
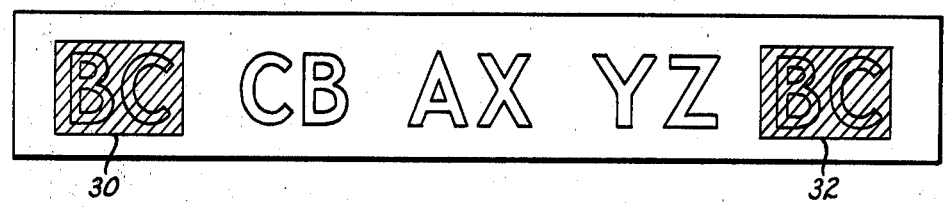
FIG. 2 is a plan view of further material for use with reading readiness according to the present invention.

Once basic form discrimination skills have been achieved it is desireable to work with combinations of letters and objects. For instance, as shown in FIG. 2, an original combination 30 of the letters "B" and "C" is utilized, and objects from which a duplicate combination 32 must be selected include combinations "CB," "AX" and "YZ." The material of FIG. 2 may be employed to teach combination discrimination, that is, one may begin the teaching process with all discrimination aids available to the child, that is, form, size, color and texture, and gradually remove these aids until the child relies on only form. Of course, any and all of these steps may be omitted if the child already has the ability to discriminate these combinations.

Figure 3:
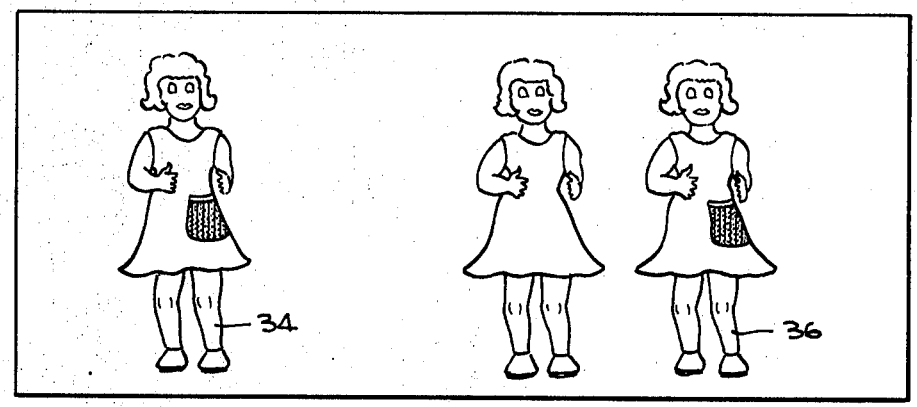
FIG. 3 is a plan view of further material for use with reading readiness according to the present invention.

In order to concentrate the child's attention to internal configuration, lines may utilized as shown in FIG. 3. That is, an original 34 may be a doll with a soft red pocket, and the objects from which a duplicate 36 must be selected have the same basic external shape as the original, however, only the duplicate has a soft red pocket. Thus the child must look beyond basic form to internal configuration accentuated by texture and color to detect the duplicate and original. The next step in developing skill in discriminating internal configuration is to remove the texture so that the child has only the color red of the pocket to rely on to select the correct duplicate.

Utilizing the above methods a child may be prepared for reading by teaching the entire alphabet of upper and lower case letters, the numbers 0 through 9 and it is also possible to learn a vowel vocabulary with the multisensory approach of the present invention so that a child may be at his optimum in basic skills in beginning reading.

The multisensory approach to reading will be explained with respect to FIGS. 4 and 5. The basic concepts used are the same as those in teaching the child to discriminate objects; however, we are now concerned with forms and sounds and thus a more liberal use of texture and color is necessary to aid the child in reading.

Figure 4:
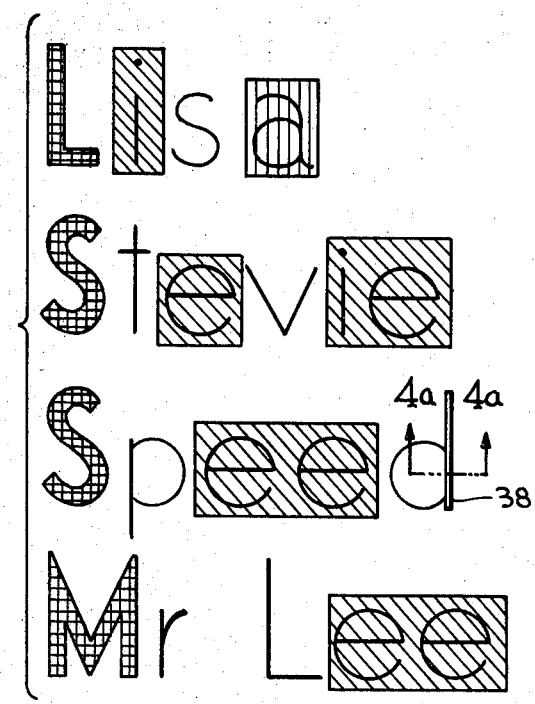
FIG. 4 is a plan view of a plurality of words for use with the teaching of reading according to the present invention.
Figure 4A:
FIG. 4a is a sectional view taken along lines 4a–4a of FIG. 4.

In FIG. 4 there are four words provided and the same sound, that is, the long "e" sound in each word, is distinguished by color and texture in the same manner as described with respect to FIG. 1. As an example, the "i" in "Lisa," the "e" and "ie" in "Stevie," the "ee" in "Speed," and the "ee" in "Mr. Lee" may all be colored green and pin holes may be disposed in these letters to provide a prickly texture. A child with a better grasp of form discrimination may be reading these words without the texture aid and a more advanced child may read these words with no aid whatsoever. It is noted that the first letter of each word is enlarged with respect to the remaining letters of the word. This concept is used to teach the child to read from left to right. The "d" in "Speed" will have a red line adjacent the upright portion 38 of the letter in order to aid the child in distinguishing a "d" from a "b," and, as shown in FIG. 4a which is a sectional view of the "d" in "Speed" taken along lines 4a–4a, upright portion 38 may be raised to further distinguish a "d" from a "b" which will not have such distinguishing structure. Similarly all vowel sounds will have a particular color and texture associated therewith so that while the child is not instructed that letters colored green are to sound like a long "e," he will become accustomed to associating green with the sound of the long "e".

Thus, by using the material shown in FIG. 4, a child may be aided in the recognition and pronunciation of words, and by utilizing a variety of color and texture schemes with vowel sounds, letter combinations and individual letters, the learning process may be eased for those children that need help. Of course, when learning words, the children will be provided with textual material having multicharacteristic indicia commensurate with their abilities. That is, some children will need the aid of both color and texture while others will need only color and others will need no aids.

Each child in the class will be given textual material corresponding to his ability, and thus all students in the class may read the same subject matter together. For instance, each student will have in front of him the textual material shown in FIG. 5. In the first sentence "Stevie eats." all the vowel sounds are the long "e" and thus they will all be colored green and have a prickled texture. The second sentence "Kathy is a baby." includes many vowel sounds such as the short "a" in "Kathy" which is colored orange and has a grainy texture. The "y" in "Kathy" is the long "e" sound and will be colored green with a prickled texture. The "i" in "is" is a short "i" and will be colored blue with a greasy texture. The word "a" is colored similar to the "a" in "Kathy" due to its similar sound and the "a" in "baby" will be colored yellow with a silky texture to denote the long "a" sound. The "y" in "baby" is colored green with a prickled texture to denote the long "e." The third sentence is "Kathy has a bed." and the last word "bed" will have the "e" colored red with a chalky texture and a "d" is denoted in the same manner as explained with respect to FIG. 4. The fourth sentence "Lisa eats cheese." has the long "e" sound colored green with a prickled texture as previously described and the "a" in "Lisa" is colored purple to indicate the "ah" sound associated therewith. It is noted that the last "e" in "cheese" is colored gray in order to denote that it is a silent letter with no effect on pronunciation. Similarly the "th" in "Kathy" is colored yellow-green and textured to denote the special sound associated with the combination of these letters.

These four sentences have been used as an illustration to indicate that entire books or stories may be printed utilizing colors and texture to aid in reading. Thus, the students in a particular class may utilize textual materials commensurate with their individual abilities. That is, a student who needs no help may read textual material of conventional black print due to his ability to recognize forms and sounds, while other students may require the aid of color but not texture and yet others students may require both color and texture as an aid in reading.

As the students ability to recognize form progresses, the first aid such as texture may be taken away from his text and thereafter the color aid may be taken away so that the student may progress to reading from form alone.

A method of multisensory reading is thereby provided wherein textual material having multicharacteristic indicia is scanned by sight and feel simultaneously in order to facilitate reading by using a plurality of senses.

Thus it is seen that methods are provided which teach both reading and reading readiness so that a student does not have to drop behind or work at a level other than the level at which he is best suited due to his lack of basic skills in reading. This is accomplished by utilizing a plurality of senses to aid recognition when reading.

The basic concept of the present invention has application to the learning of arithmetic in that numbers may be recognized from the method associated with FIG. 1, and by placing a number of raised dots corresponding to the numbers, a child, by using the sense of touch, may associate the form of a number with its quantitative meaning. Furthermore, colors may be utilized to aid the child in distinguishing columns in arithmetic. That is, for instance, when adding or subtracting, the color red may pervade the units column and the color blue may pervade the tens column thereby aiding the child in distinguishing the columns and keeping them isolated from one another.

In as much as the present invention is subject to many variations, modifications and changes in detail, it is intended that all matter described in the foregoing specification or shown in the accompanying drawings shall be interpreted as illustrative and not in a limiting sense.

We claim:

1. A method of multisensory reading comprising the steps of:

providing textual material composed of words having a plurality of groups of similar sounds including at least a first group of first similar sounds having color and texture indicia associated therewith and a second group of second similar sounds having color and texture indicia associated with said first similar sounds;

scanning said textual material by sight in order to determine sounds by said color indicia; and simultaneously scanning said textual material to feel in order to aid in the recognition of sounds by said texture indicia whereby reading is facilitated by the use of a plurality of senses.

2. The method as recited in claim 1 wherein said step of providing textual material includes enlarging the first letter of each word in comparison to the remaining letters.

3. The method as recited in claim 1 wherein said step of providing textual material includes coloring all silent letters with the same color.

4. The method as recited in claim 3 wherein said step of providing textual material includes coloring all of the same vowel sounds with the same color.

5. The method as recited in claim 4 wherein said step of providing textual material includes texturing all of the same vowel sounds with the same texture.

6. The method as recited in claim 5 wherein said step of providing textual material includes coloring all letter combinations having the same sound with the same color.

7. The method as recited in claim 6 wherein said step of providing textual material includes texturing all letter combinations having the same sound with the same texture.

8. The method as recited in claim 7 wherein said step said step of providing textual material includes placing a colored line along the upright portions of all "d's" in the textual material.

9. The method as recited in claim 8 wherein said step of placing a colored line along the upright portion of all "d's" includes texturing said colored line.

10. A method of multisensory association for reading readiness comprising the steps of:

providing an original object having form, color and texture indicia associated therewith;

providing a row of objects including a duplicate of said original having the same form, color and texture indicia as said original in form, color and texture indicia;

scanning said row of objects by sight in order to detect said duplicate by form and color; and simultaneously scanning said row of objects by feel to detect said duplicate by texture whereby a plurality of senses may be utilized to improve basic reading skills.

11. The method as recited in claim 10 wherein said step of providing an original object includes coloring said original object with a specific color; and said step of providing a row of objects including a duplicate includes coloring said duplicate with said specific color.

12. The method as recited in claim 11 wherein said step of providing an original object includes texturing said original object with a specific texture; and said step of providing a row of objects including a duplicate includes texturing said duplicate with said specific texture.

13. Textual material composed of words having a plurality of groups of similar sounds including at least a first group of first similar sounds having color and texture indicia associated therewith and a second group of second similar sounds having color and texture indicia associated therewith different from said color and texture indicia associated with said first similar sounds such that said first and second similar sounds are distinguishable by color and texture whereby reading of the textual material is facilitated by the use of a plurality of senses.

14. The textual material as recited in claim 13 wherein all of the same vowel sounds are provided with the same color and texture indicia and all letter combinations having the same sound are provided with the same color and texture indicia.

UNITED STATES PATENT OFFICE
CERTIFICATE OF CORRECTION

Patent No. 3,571,951          Dated March 23, 1971

Inventor(s) Herbert A. Siegel et al

It is certified that error appears in the above-identified patent and that said Letters Patent are hereby corrected as shown below:

In claim 10, line 7 after "original" insert -- and object differing from said original --.

In the specification Column 2, line 59 delete "aide" and substitute therefor -- aided --.

Signed and sealed this 28th day of September 1971.

(SEAL)
Attest:

EDWARD M. FLETCHER, JR.          ROBERT GOTTSCHALK
Attesting Officer                Acting Commissioner of Patents